United States Patent
O'Dea et al.

(10) Patent No.: US 9,834,207 B2
(45) Date of Patent: Dec. 5, 2017

(54) METHOD AND SYSTEM FOR DETECTING, TRACKING AND ESTIMATING STATIONARY ROADSIDE OBJECTS

(71) Applicant: GM GLOBAL TECHNOLOGY OPERATIONS LLC, Detroit, MI (US)

(72) Inventors: Kevin A. O'Dea, Ann Arbor, MI (US); Shuqing Zeng, Sterling Heights, MI (US); James N. Nickolaou, Clarkston, MI (US); Bradley Hamner, Pittsburgh, PA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 493 days.

(21) Appl. No.: 14/253,090

(22) Filed: Apr. 15, 2014

(65) Prior Publication Data
US 2015/0293216 A1 Oct. 15, 2015

(51) Int. Cl.
*B60W 30/02* (2012.01)
*B60W 30/12* (2006.01)
*B60W 30/14* (2006.01)
*G01S 13/93* (2006.01)
*G01S 13/72* (2006.01)
*G01S 13/87* (2006.01)
*G01S 13/86* (2006.01)

(52) U.S. Cl.
CPC ............ *B60W 30/02* (2013.01); *B60W 30/12* (2013.01); *B60W 30/14* (2013.01); *G01S 13/726* (2013.01); *G01S 13/87* (2013.01); *G01S 13/931* (2013.01); *G01S 13/867* (2013.01); *G01S 2013/9353* (2013.01); *G01S 2013/9367* (2013.01); *G01S 2013/9375* (2013.01)

(58) Field of Classification Search
None
See application file for complete search history.

(56) References Cited

U.S. PATENT DOCUMENTS

| | | | | |
|---|---|---|---|---|
| 6,198,426 B1 * | 3/2001 | Tamatsu | ................ | G01S 13/931 342/114 |
| 6,593,873 B2 * | 7/2003 | Samukawa | ........... | G01S 13/426 340/425.5 |
| 8,090,152 B2 * | 1/2012 | Kageyama | ......... | G06K 9/00798 382/104 |
| 8,170,284 B2 * | 5/2012 | Fujita | ....................... | B60R 1/00 382/104 |

(Continued)

*Primary Examiner* — Shelley Chen
(74) *Attorney, Agent, or Firm* — Reising Ethington, P.C.

(57) ABSTRACT

A system and method for selectively reducing or filtering data provided by one or more vehicle mounted sensors before using that data to detect, track and/or estimate a stationary object located along the side of a road, such as a guardrail or barrier. According to one example, the method reduces the amount of data by consolidating, classifying and pre-sorting data points from several forward looking radar sensors before using those data points to determine if a stationary roadside object is present. If the method determines that a stationary roadside object is present, then the reduced or filtered data points can be applied to a data fitting algorithm in order to estimate the size, shape and/or other parameters of the object. In one example, the output of the present method is provided to automated or autonomous driving systems.

26 Claims, 7 Drawing Sheets

(56) References Cited

U.S. PATENT DOCUMENTS

| | | | | |
|---|---|---|---|---|
| 8,411,900 B2* | 4/2013 | Naka | ................. | G06K 9/00798 |
| | | | | 340/436 |
| 2002/0014988 A1* | 2/2002 | Samukawa | ........... | G01S 13/426 |
| | | | | 342/70 |
| 2008/0037828 A1* | 2/2008 | Fujita | ........................ | B60R 1/00 |
| | | | | 382/104 |
| 2010/0020074 A1* | 1/2010 | Taborowski | .......... | G06T 7/0065 |
| | | | | 345/420 |
| 2010/0260377 A1* | 10/2010 | Takahashi | ............. | G06T 7/2053 |
| | | | | 382/103 |
| 2010/0295668 A1* | 11/2010 | Kataoka | ............... | B62D 15/025 |
| | | | | 340/435 |
| 2011/0063097 A1* | 3/2011 | Naka | ................. | G06K 9/00798 |
| | | | | 340/435 |

* cited by examiner

METHOD AND SYSTEM FOR DETECTING, TRACKING AND ESTIMATING STATIONARY ROADSIDE OBJECTS

FIELD

The present invention generally relates to vehicles with automated driving modes or features and, more particularly, to methods for detecting, tracking and estimating stationary objects located off to the side of a road, such as guardrails, when a host vehicle is being driven in an automated driving mode.

BACKGROUND

When a host vehicle is being driven in an automated or autonomous driving mode, it may be helpful to have data relating to stationary roadside objects, like guardrails or barriers. Such data not only informs the host vehicle of the presence of the stationary objects, it may also provide the host vehicle with information on the road or drivable area, as such stationary objects oftentimes follow the path of the road itself. Because of the large amount of data that can be generated by vehicle mounted sensors, such as multiple forward looking radar sensors, it may be helpful for the host vehicle to filter or reduce the sensor data before applying it to data fitting algorithms or the like.

SUMMARY

According to one embodiment, there is provided a method for evaluating roadside stationary objects. The method may comprise the steps of: receiving sensor readings from one or more vehicle mounted sensor(s), the sensor readings include a plurality of data points and each data point corresponds to an object that is within a field-of-view of one of the sensors; consolidating the plurality of data points into a smaller set of consolidated data points; classifying the consolidated data points into a smaller set of classified data points, the classified data points correspond to one or more stationary objects; pre-sorting the classified data points into first and second smaller sets of pre-sorted data points, the first set of pre-sorted data points correspond to one or more stationary objects located only on a left side of the road and the second set of pre-sorted data points correspond to one or more stationary objects located only on a right side of the road; determining if there is one or more stationary objects present on the left side of the road by using the first set of pre-sorted data points, and determining if there is one or more stationary objects present on the right side of the road by using the second set of pre-sorted data points; and when there is a stationary object present on the left side of the road then applying the first set of pre-sorted data points to a data fitting algorithm that estimates a size, shape and/or location of the stationary object, and when there is a stationary object present on the right side of the road then applying the second set of pre-sorted data points to a data fitting algorithm that estimates a size, shape and/or location of the stationary object.

DRAWINGS

Preferred exemplary embodiments will hereinafter be described in conjunction with the appended drawings, wherein like designations denote like elements, and wherein.

Figure 2:
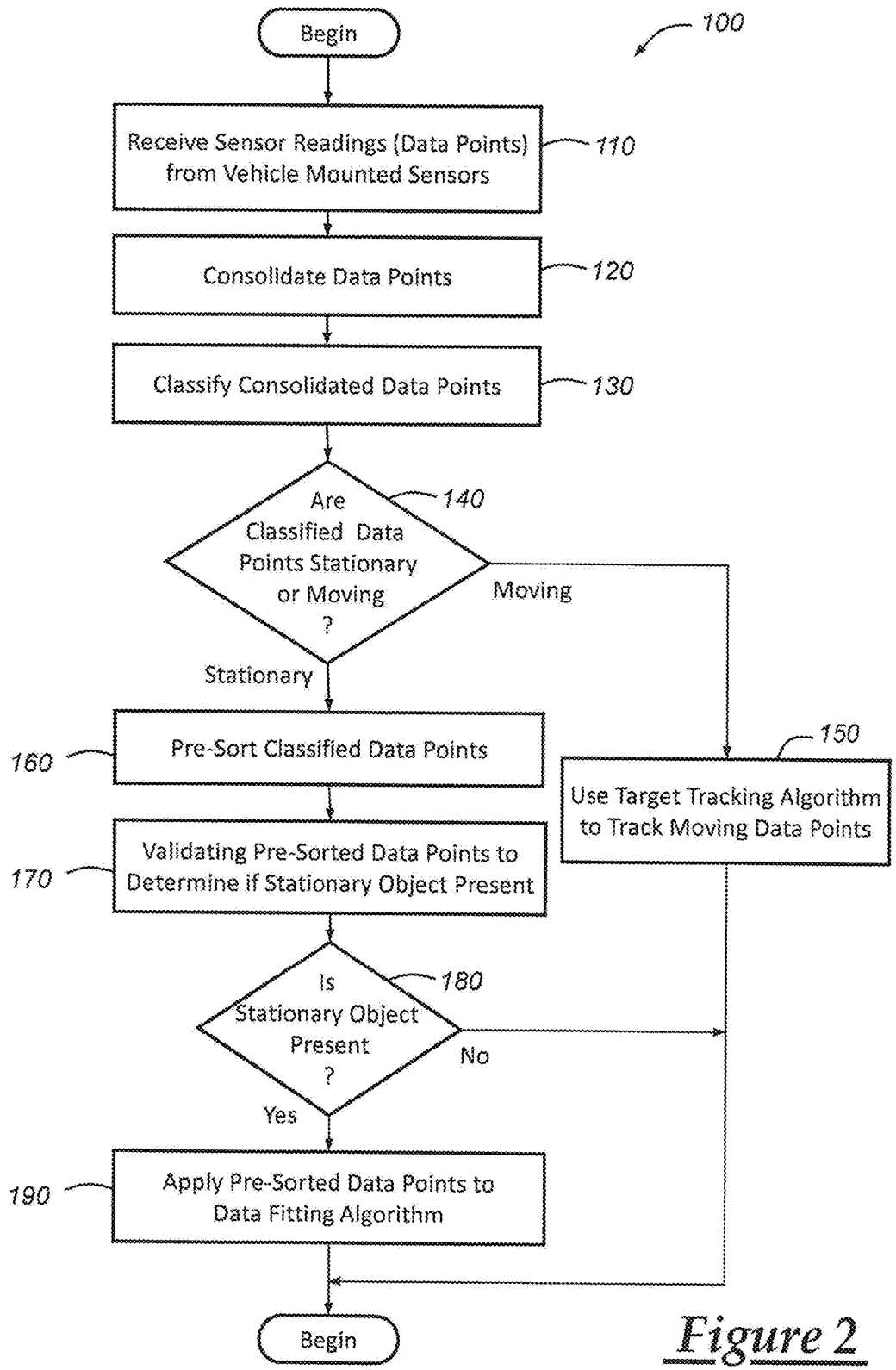
FIG. 2 is a flowchart illustrating an exemplary embodiment of the detecting, tracking and estimating method and it may be used with a host vehicle, such as the one shown in FIG. 1.
Figure 4A:
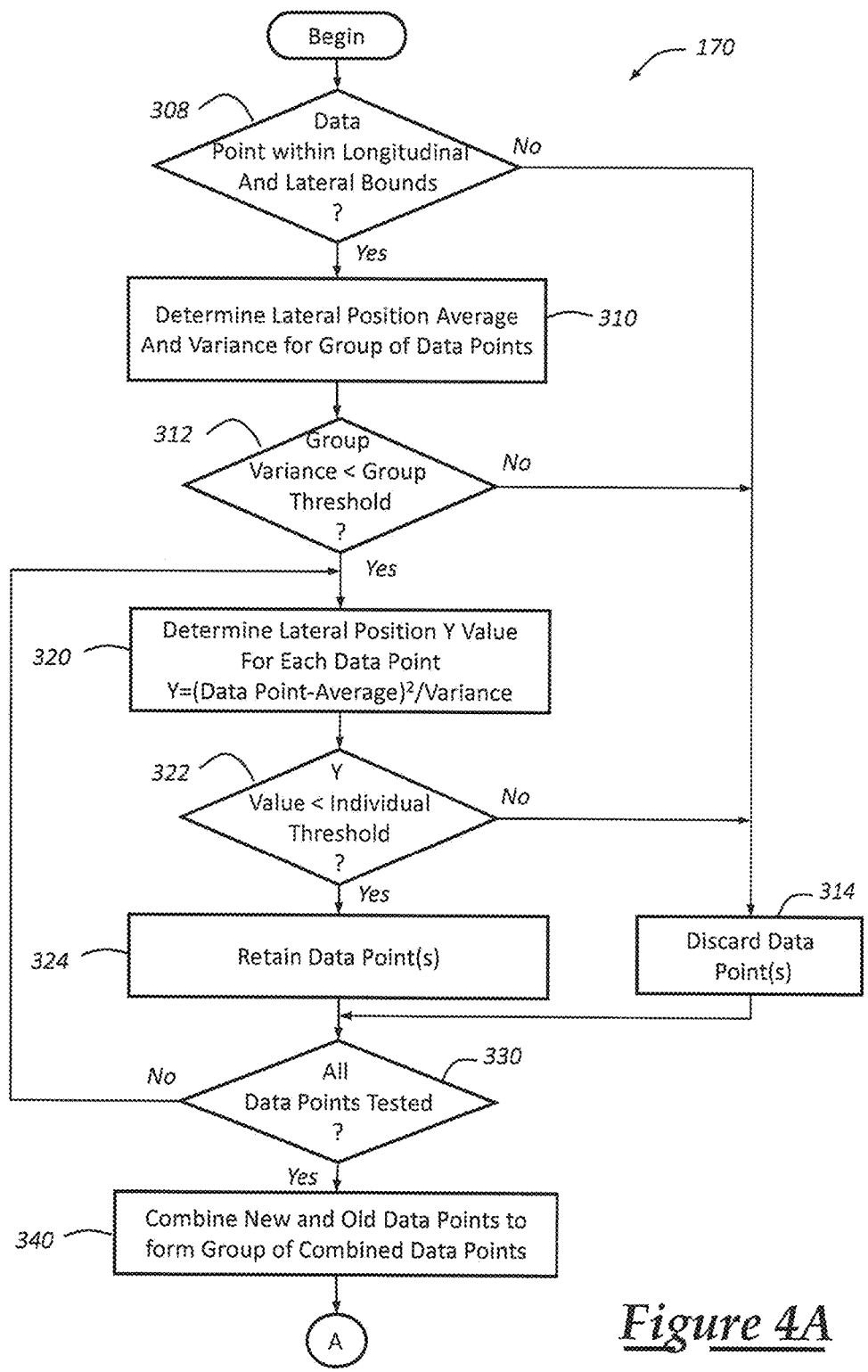
Figure 4B:
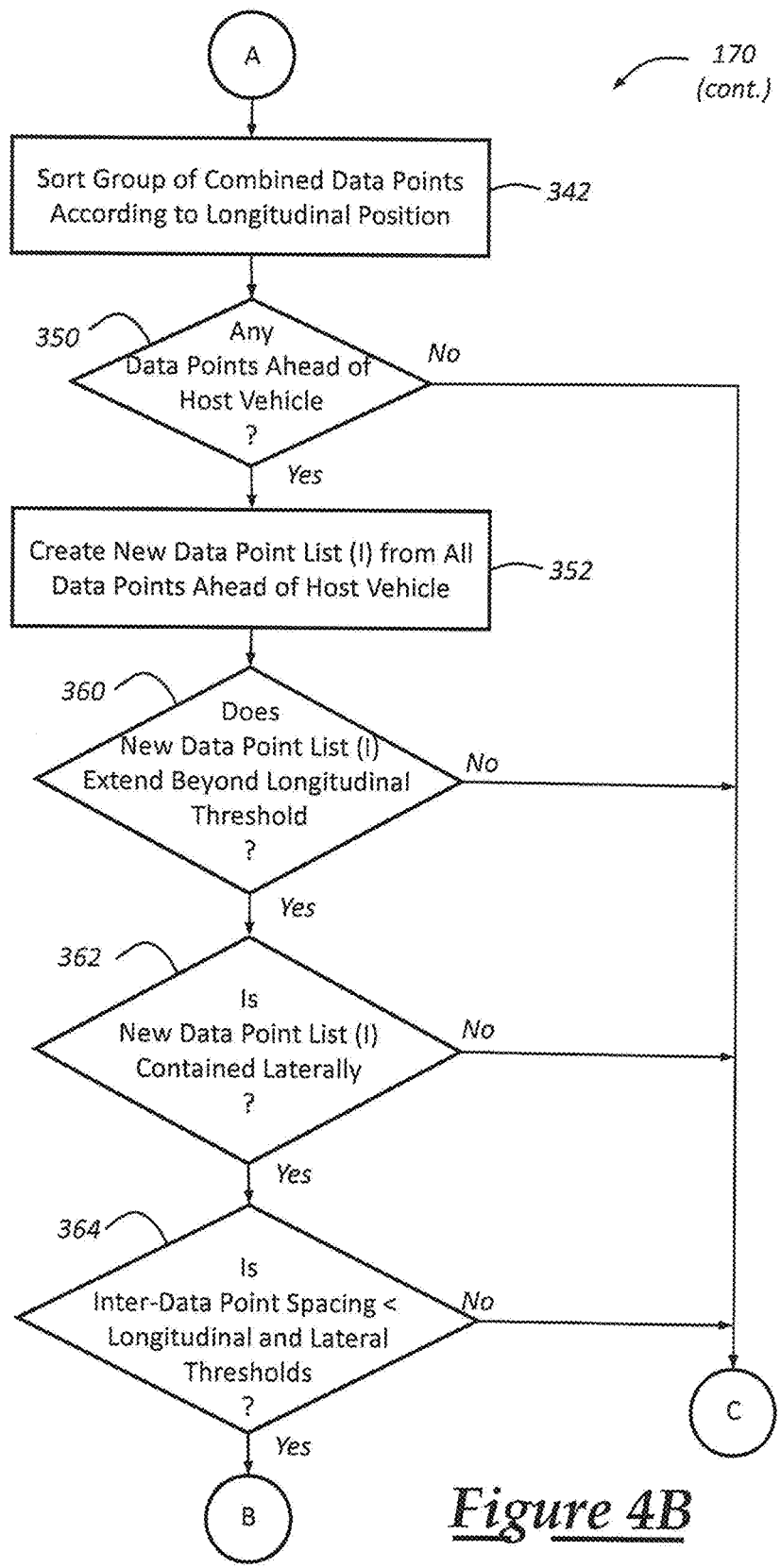
Figure 4C:
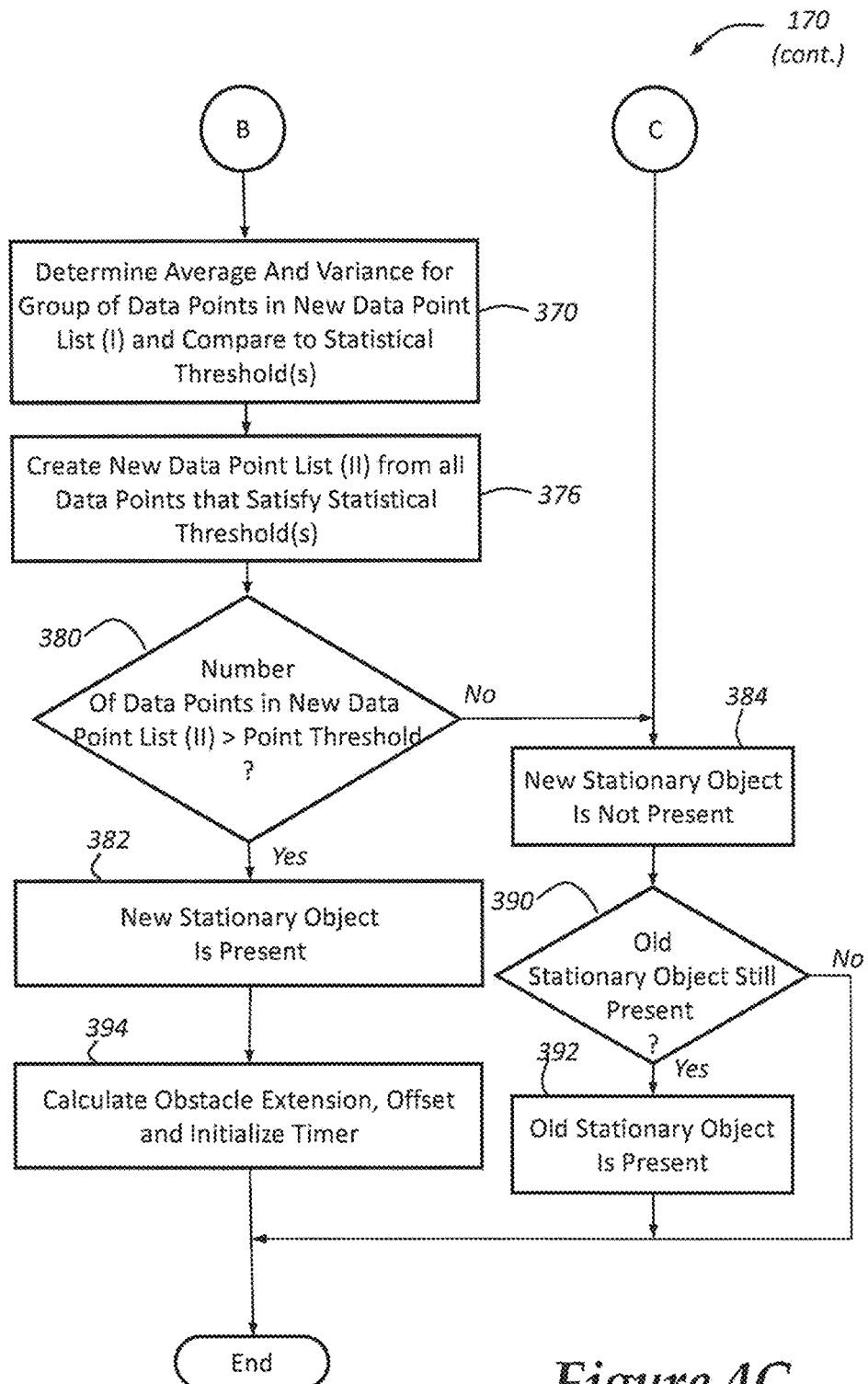
Figure 5:
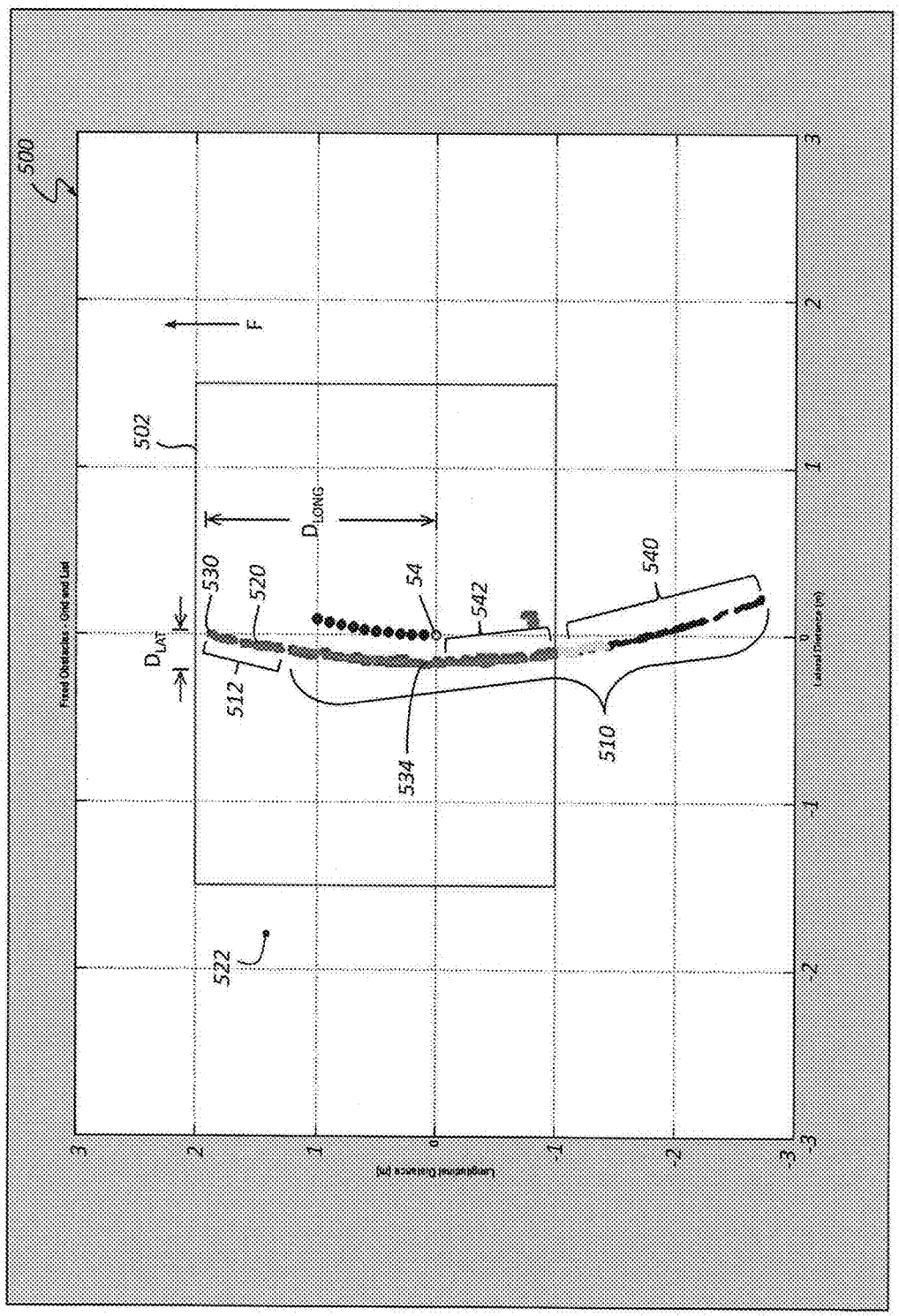

FIGS. 4A-C are flowcharts illustrating a more detailed exemplary embodiment of a stationary object detection step from the method of FIG. 2; and FIG. 5 is an illustration of an exemplary visual representation with a grid or area of interest around the host vehicle and it may be used with the method of FIG. 2.

DESCRIPTION

The system and method described herein may be used to selectively reduce or filter data provided by one or more vehicle mounted sensors before using that data to detect, track and/or estimate a stationary object located along the side of a road, such as a guardrail or barrier. According to one example, the method reduces the amount of data by consolidating, classifying and pre-sorting data points from several forward looking radar sensors before using those data points to determine if a stationary roadside object is present. If the method determines that a stationary roadside object is present, then the reduced or filtered data points can be applied to a data fitting algorithm in order to estimate the size, shape and/or other parameters of the object. The output of the present method may be used to track the stationary roadside objects as the host vehicle is being driven, or it may be provided to any number of other systems or methods that have an interest in knowing the size, shape and/or location of such objects. In one example, the output of the present method is provided to systems or methods that control certain aspects of the host vehicle during an automated or autonomous driving mode and may be useful for supplementing or filling in missing data regarding the stationary roadside objects.

The system and method described herein may be particularly well suited for vehicles employing some type of automated, autonomous or self driving mode. The terms "automated," "automated driving" and "automated driving mode," as used herein, broadly include any fully-, semi- or partially automated, autonomous or self driving mode or state where the vehicle automatically controls one or more aspects of driving based on gathered feedback and without input from the driver. The National Highway Transportation Safety Administration (NHTSA) has recently classified automated driving into the following levels based on the functionality and degree of autonomy: level 0 (no automation)—the driver is in complete and sole control of the primary vehicle controls (braking, steering, throttle and motive power) at all times; level 1 (function specific automation)—automation at this level involves a specific control function (e.g., electronic stability control or pre-charged brakes) where the vehicle automatically assists with one of the primary vehicle controls in order to enable the driver to regain control or act more quickly than is possible if the driver acted alone; level 2 (combined function automation)—this level involves automation of at least two of the primary vehicle controls working in unison so that the driver is relieved of control of those functions (e.g., adaptive cruise control (ACC), automated lane centering, automated lane keeping, automated lane changing); level 3 (limited self driving automation)—automation at this level enables the driver to cede full control of all safety-critical functions under certain traffic or environmental conditions and to rely heavily on the vehicle to monitor for changes in those conditions that would necessitate transition back to driver control (e.g., the Google car is a limited self driving vehicle that expects the driver to be available for occasional control); level 4 (full self-driving automation)—at this level, the vehicle is designed to perform all safety-critical functions and to monitor roadway conditions for an entire trip, and the design expects that the driver will provide destination and navigation input but is otherwise unavailable for control during the trip (e.g., this includes both occupied and unoccupied vehicles). The present system and method may be used with a vehicle operating at any of the aforementioned automated "levels," as well as manual or non-automated driving modes.

Figure 1:
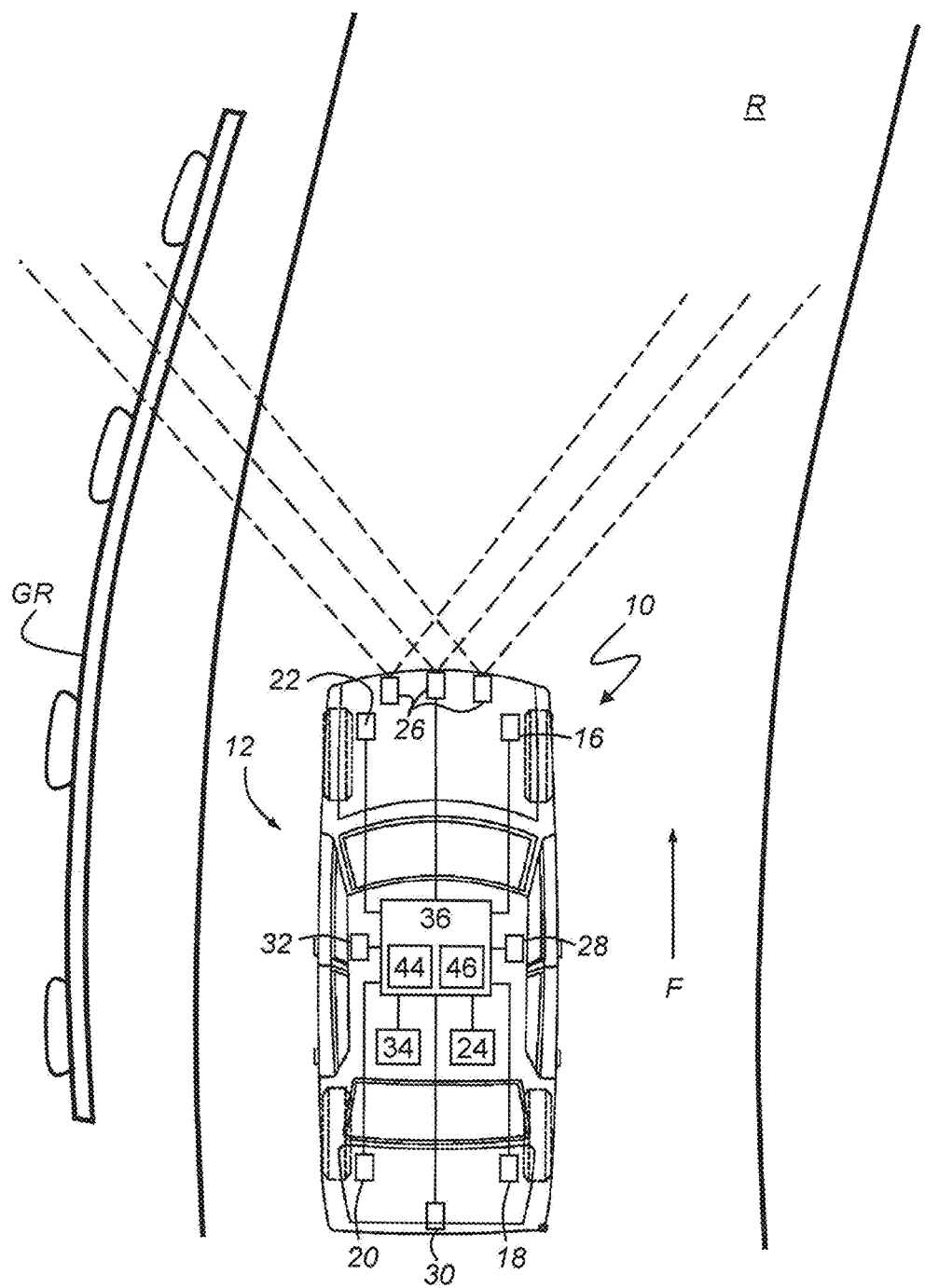
FIG. 1 is a schematic view of a host vehicle operating in an automated driving mode, where several forward looking vehicle mounted sensors are gathering information related to a stationary guardrail located off to the side of the road.

With reference to FIG. 1, there is shown a schematic view of an exemplary embodiment of a host vehicle 10 that includes a system 12 for detecting, tracking and estimating stationary roadside objects. In this particular example, the system 12 is being used to evaluate a stationary guardrail GR located off to the left side of the road R, however, the present system and method may be used to evaluate to the exemplary embodiment shown here by way of example. Host vehicle 10 is depicted in the illustrated embodiment as a passenger car, but it should be appreciated that any other vehicle including motorcycles, trucks, sports utility vehicles (SUVs), recreational vehicles (RVs), semi trucks, etc. can also be used. System 12 may include any number of different hardware components and other devices, including various types of sensors 18-32, a telematics unit 34, and a control module 36.

Sensors 16-22 are speed sensors and may generate readings that are representative of the position, velocity, acceleration and/or other dynamics of host vehicle 10. In one embodiment, sensors 16-22 use the rotational speed of the vehicle wheels to generate vehicle speed signals, but in other embodiments they may use ground speed, accelerator pedal position, accelerometers, engine speed, engine output, throttle valve position, or some other suitable technique for determining vehicle speed. Sensor 24 is a vehicle dynamics sensor and may be used to determine the yaw rate, lateral or longitudinal acceleration and/or other dynamic parameters of host vehicle 10. Sensors 26 are vehicle mounted sensors that are used to scan, examine, evaluate, etc. an area in front of and off to the side of the host vehicle 10. According to the non-limiting example in FIG. 1, vehicle mounted sensors 26 include forward-looking object detection sensors (in this case three sensors, but could be one or more), such as those that use short or long range radar, laser, lidar or some combination thereof to provide sensor readings to the present method that include data points, as will be explained. It should be appreciated that sensors 26 may include other types of sensors, including different types of cameras, and can be mounted in any suitable forward looking position and orientation. Sensors 26 should have a field-of-view with an angular range that is wide enough to capture and evaluate roadside objects (e.g., greater than about 100°). Additional sensors 28-32 may be used to further evaluate the area surrounding the host vehicle 10, including areas on the side and behind the host vehicle. Other known sensors may certainly be used in addition to or in lieu of those described above, as the present system and method are not limited to any particular sensor type.

Telematics unit 34 enables wireless voice and/or data communication over a wireless carrier system so that the host vehicle can communicate with a backend facility, other telematics-enabled vehicles, or some other entity or device. Any suitable telematics unit 34 and wireless communication scheme may be employed. In one embodiment, the telematics unit 34 is used to share information related to the stationary roadside objects detected by system 12 with other vehicles and or a backend facility to assist with automated driving or other features, but this is simply an optional feature and is certainly not necessary.

Control module 36 may communicate with sensors 16-32, telematics unit 34 and/or any other components, devices, modules, systems, etc. on the host vehicle 10, and it may be used to carry out some, most or even all of the electronic instructions or steps that help make up the present method described herein. The control module 36 can be any type of device capable of processing electronic instructions and may include one or more processing devices 44 that include processors, microprocessors, microcontrollers, host processors, controllers, vehicle communication processors, and application specific integrated circuits (ASICs), to name a few possibilities. The control module can execute various types of digitally-stored instructions, such as software or firmware programs stored in a memory device 46, which enable the control of various vehicle functions.

Depending on the particular embodiment, the control module 36 may be a stand-alone electronic controller (e.g., a pre-packaged sensor controller that incorporates both sensors and controller into a single package, an object detection controller, a safety controller, etc.), may be incorporated or included within another vehicle electronic module (e.g., automated driving control module, active safety control module, brake control module, steering control module, engine control module, etc.), or may be part of a larger network or system (e.g., automated driving system, adaptive cruise control system, lane departure warning system, active safety system, traction control system (TCS), electronic stability control (ESC) system, antilock brake system (ABS), etc.), to name a few possibilities. Accordingly, the control module 36 is not limited to any one particular embodiment or arrangement and may be used by the present method to detect, track and/or estimate stationary roadside objects.

Turning now to FIGS. 2-5, there is shown an embodiment of a method 100 that may be used with host vehicle 10, particularly when the host vehicle is being driven in an automated driving mode.

In step 110, the method receives sensor readings from one or more vehicle mounted sensors, such as radar sensors. The sensors are preferably positioned on the host vehicle 10 so that they can scan or evaluate an area somewhat off to the side of the host vehicle as it is being driven. According to one embodiment, step 110 gathers data from one or more forward-looking radar sensors 26 in the form of data points, where each data point corresponds to a stationary or moving object within the radar sensor field-of-view, but the sensors could include sideward- or rearward-looking sensors as well. Most large objects, such as guard rails, will generate multiple data points. It is typical for a vehicle mounted sensor to identify multiple objects within its field-of-view at any given time (e.g., a guardrail, a road sign, several nearby vehicles, etc.) and to provide one or more data points for each object sensed.

Skilled artisans will appreciate that some vehicle mounted sensors can be purchased in the form of pre-packaged modules that output data according to somewhat standard formats. For instance, some radar sensors are combined with electronic circuitry and memory means in a single module and are designed to sense objects within their fields-of-view and to output a data point in the form of coordinates for each object that they sense; this entire module, including the sensors, circuitry, memory, etc. may be referred to herein as a "vehicle mounted sensor." The coordinates may be Cartesian coordinates, polar coordinates, or coordinates based on some other type of coordinate system, and the coordinates can be accompanied by other types of data. In one example, step 110 gathers sensor readings from one or more vehicle mounted sensors 26, and the sensor readings include data points where each data point is in the form of polar coordinates which includes a radial coordinate (the distance or range from the sensor to the sensed object) and an angular coordinate (the polar angle or azimuth which is provided in degrees and is based on a predetermined polar axis). These polar coordinates may be accompanied by other data or information, such as data in the form of a confidence rating that indicates the level of confidence that the sensed object is actually present (such a confidence rating could be based on how many consecutive times the sensor has detected the object), as well as data indicating whether or not the sensed object is stationary or moving. If a vehicle mounted sensor detects more objects than some predetermined threshold (e.g., more than twenty objects at a given time), then the sensor may prioritize the objects and only output data points for the objects that are deemed most relevant.

Step 120 consolidates the data points into a more manageable collection of data. Consider the example where three forward looking vehicle mounted sensors 26 are concurrently providing sensor readings to a control module 36, and each sensor provides data points for up to twenty objects per cycle. Thus, a total of sixty data points can be sent and received each sensor cycle, which can occur every 40-100 ms, for example. Step 120 may employ techniques like clustering, grouping and/or mapping in order to consolidate the data and reduce the number of data points from sixty to some smaller number, like fifteen. In one example, vehicle mounted sensors use a labeling algorithm or the like to consolidate data points according to one or more of the following techniques.

The term "clustering," as used herein, broadly refers to a data processing technique that clusters together or otherwise consolidates multiple data points from a single sensor when the data appears to pertain to the same object. As mentioned above, larger objects, like a large road sign, may result in multiple data points which can be clustered together in step 120 in order to reduce the overall amount of data being processed.

The term "grouping," as used herein, broadly refers to a data processing technique that groups together or otherwise consolidates multiple data points from multiple sensors when the data is redundant and appears to pertain to the same object. For instance, if a first radar sensor generates a data point for a nearby vehicle and a second radar sensor generates a similar data point for the same vehicle, then step 120 may employ a grouping function to consolidate these two pieces of data together.

The term "mapping," as used herein, broadly refers to a data processing technique where stored map data (e.g., map data made available by a vehicle navigational system) is used to supplement or otherwise enhance the data points from a sensor by providing information on known objects that should be in the field of view of the sensor. It is not mandatory that step 120 consolidate the data points from the different sensors by using all of the aforementioned data processing techniques, as any suitable combination of such techniques, other techniques, or none at all may be used. The output of consolidation step 120 is referred to herein as "consolidated data points" and may include data points that have been consolidated as well as those that have not.

Next, step 130 classifies the consolidated data points. One type of classification involves determining if each consolidated data point represents a stationary object or a moving object. It should be appreciated that numerous algorithms and techniques may be used to accomplish this step, including those based on Doppler measurements and detected object structure. For example, step 130 may gather vehicle speed and/or other dynamic information from sensors 16-24 on the host vehicle and use this information in conjunction with the output of the radar sensors 26 to determine if a consolidated data point has a zero ground speed or not. Keeping with the example from above, assume that step 130 decides that of the fifteen consolidated data points, four of them correspond to moving objects and eleven pertain to stationary objects. Other techniques for determining the stationary versus dynamic state of an object may also be used. It may be helpful for the consolidated data points to be converted from polar coordinates to Cartesian coordinates or some other type of coordinate system before carrying out step 130, but this is not mandatory. Classification of the consolidated data points could entail evaluations other than simply determining if an object is stationary or moving. For instance, step 130 may be used to distinguish a long moving semi truck or tractor trailer from a stationary guard rail of approximately the same length. The output of classification step 130 is referred to herein as "classified data points" and may include a set of data points that have been consolidated and/or classified and those that have not.

Step 140 then divides or distinguishes the now classified data points on the basis of whether they represent stationary or moving objects. This step may be performed on an individual data point basis, on a consolidated or group data point basis, or according to some other method. For data points that represent moving or dynamic objects, like nearby moving vehicles, they may be tracked according to any suitable known target tracking algorithm, step 150. For data points that are representative of stationary objects, the method proceeds to step 160. Steps 120-140 are generally designed to reduce or filter the large amount of raw sensor data that is generated by the different vehicle mounted sensors so that the subsequent data fitting algorithms are only provided data that has already been consolidated and/or classified and in which the method has a high confidence. This objective of limiting or reducing the amount of sensor data that is ultimately inputted into a data fitting algorithm is demonstrated by the ongoing example used above. In that example, the method originally received sixty data points from three different sensors, but after carrying out steps 120-140, only eleven classified data points are sent to the next step 160.

Step 160 is designed to pre-sort the classified data points into smaller sets of pre-sorted data points that correspond to the left side of the road, the right side of the road, and the center of the road, for example. These pre-sorted data points include newly acquired data points (i.e., data points that were gathered during the most recent sensor cycle) and will be subsequently combined with a list of older data points from previous sensor cycles that have already been processed by the present method, as will be explained. The left data point set generally represents stationary objects that are off to the left side of the road that the host vehicle 10 is traveling on (e.g., guardrails, signs, etc.), the center data point set is generally representative of stationary objects that are located within the middle of the road, and the right data point set generally represents stationary objects located off to the right side of the road. Other pre-sorted sets or groups may be used instead, as the method generally attempts to narrow down and group the data points before applying them to a data fitting algorithm, as will be explained. One way for the method to further reduce or filter the overall number of data points is to discard those that are part of the center data point set. The rationale behind such a step is that most, if not all, of the stationary objects detected by the radar sensors are going to be on the left or right sides of the road and those objects in the center of the road are likely being tracked by other algorithms. It is worth noting that a vehicle operating in an automated driving mode is probably already running a number of other object tracking algorithms, like that of step 150, and could address any objects in the center of the road accordingly. The output of pre-sorting step 160 is referred to herein as "pre-sorted data points" and may include one or more sets of data points that have been consolidated, classified and/or pre-sorted and those that have not.

Figure 3:
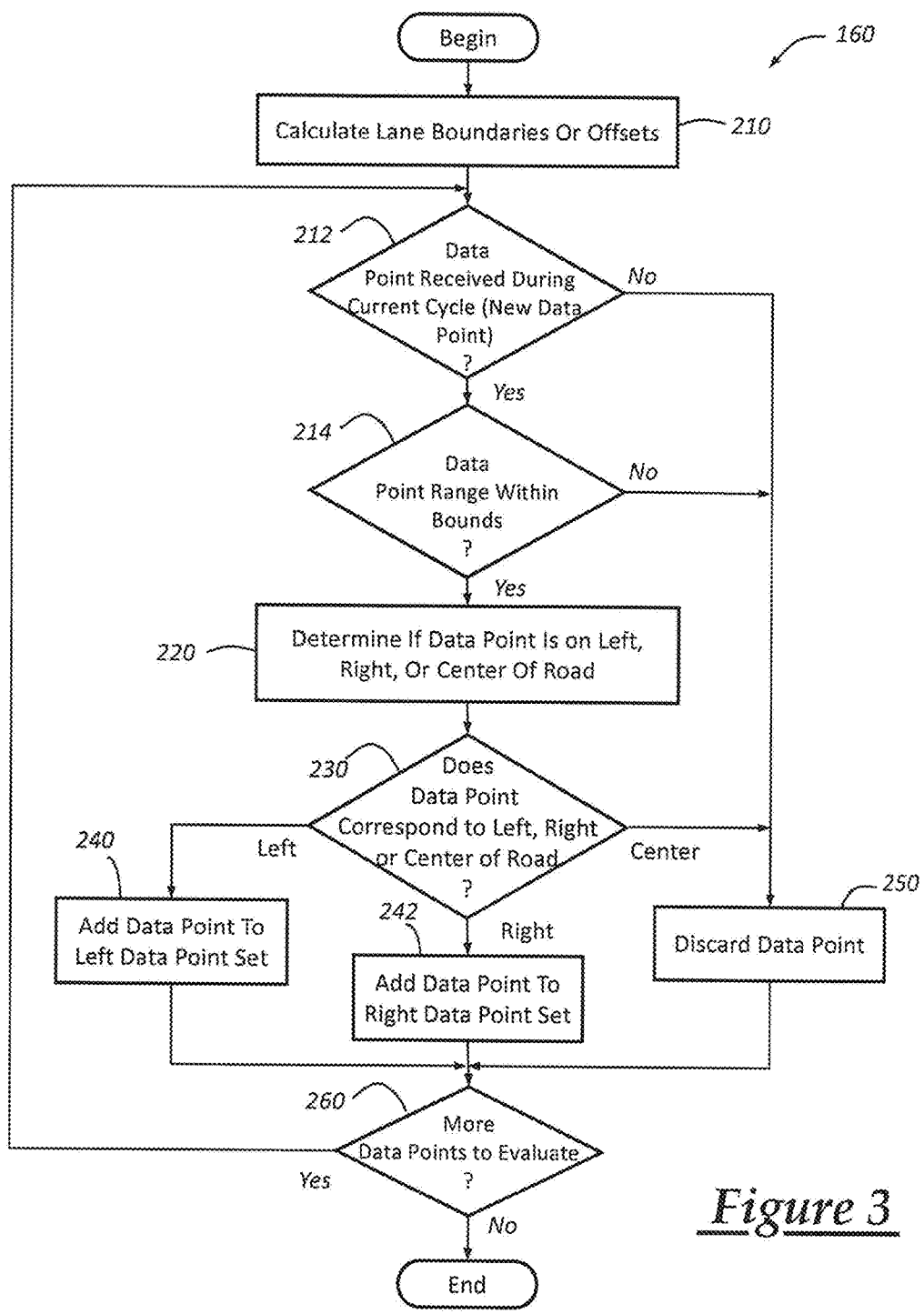
FIG. 3 is a flowchart illustrating a more detailed exemplary embodiment of a pre-sorting step from the method of FIG. 2.

Turning now to FIGS. 3 and 5, there is described one possible embodiment or implementation of the pre-sorting step 160. FIG. 3 is a flowchart that illustrates a more detailed sequence of steps or sub-steps that may be performed while carrying out step 160, while FIG. 5 shows a visual representation 500 of a grid or an area of interest 502 surrounding the host vehicle 10. In general, the pre-sorting step 160 shown in FIG. 3 is designed to further filter and sort newly acquired data points into three different sets or groups that correspond to the left, right and center of the road. This process helps make the subsequent data fitting step 190 operate more efficiently and/or accurately. The visual representation 500 that is shown in FIG. 5 is designed to help illustrate some of the features of step 160 and may also be provided to the driver through some type of visual display (e.g., a vehicle navigation screen, infotainment screen, backup camera screen, etc.) within host vehicle 10. This is optional, however, as the present method may be performed with or without providing the grid-like visual representation 500 to the driver. In those embodiments where the visual representation 500 is provided to the driver, the present method may maintain both a list of all of the stationary objects being tracked (Overall Data Point List), as well as a grid of such objects.

Starting with step 210, the method calculates or otherwise determines left and right side offsets; these offsets will be used later on when sorting the data points into left, right and/or center data point sets. If the method has access to valid sensor-based road geometry data, then step 210 may calculate the left and right side offsets based on the sensed geometry of the road. If no such valid data is available, then step 210 may calculate the left and right side offsets using other techniques, like a predicted vehicle path projection. The left and right side offsets may correspond to the leftmost and rightmost edges or boundaries of the road, to left and right lane markers, or to some other suitable boundary, and they may be relative to a projected sensor or vehicle path, to provide several possibilities. Once the left and right side offsets or boundaries have been determined, the method may proceed to the next step. It is not necessary that step 210 be executed first, as the left and right side offsets could be determined at some other time.

Step 212 determines if a data point or group of data points was sensed during the current sensor cycle; that is, this step determines if the data point in question is "old" or "new." It should be appreciated that during any given sensor cycle, the vehicle mounted sensors may capture data points that are new and have not been evaluated yet, as well as data points that are old and have already been considered by the method. If the data point in question was sensed or otherwise obtained in the current sensor cycle, then the process proceeds to step 214 for further evaluation; if the data point was gathered in a previous sensor cycle, then the method considers this data point "old" in that it has already been taken into account and is likely already saved in the Overall Data Point List or some other data structure, in which case the old data point can be discarded at step 250 and the method shown in FIG. 3 may start over for consideration of the next data point. Some non-limiting examples of "old" data points 510 and "new" data points 512 are shown in FIG. 5. Some of the old data points 510 were obtained during previous sensor cycles and have now fallen out of the grid 502, which generally corresponds to an area of interest surrounding the present location of the host vehicle 10 (e.g., the grid may be an area of approximately 6 m×6 m). As the host vehicle travels down the road in a forward direction F, new data points enter the top of the grid 502 while old data points exit the bottom of the grid.

Step 214 then determines if the range of a data point or group of data points is within some bounds. According to an embodiment where each data point is expressed in terms polar coordinates, the method checks to see if the radial coordinate of the data point (i.e., the distance or range from the sensor to the sensed object) is within some bounds. An example of a data point that has a range within some predetermined bounds is data point 520, while data point 522 is an example of a data point that has a range that is out of bounds. If the range of the data point in question is deemed to fall outside of these bounds, then the method may discard that data point in step 250 and return to the start of FIG. 3 to begin the pre-sorting process for the next data point. If, on the other hand, the range of the data point is within the prescribed bounds, then the method may store the data point and continue to step 220 for additional evaluation.

Next, step 220 determines if the data point or group of data points is on the left side, the right side, or is in the center of the road. In an exemplary embodiment, step 220 compares the lateral position of the data point, which can be gathered from the associated data point coordinates, to the left and right side offsets previously determined in step 210. If a particular data point, such as exemplary data point 320 which corresponds to a left-hand guard rail, is to the left of the left side offset, then the method concludes that this object is off to the left of the road and should continue to be tracked or monitored as a stationary object of interest. In FIG. 5, all of the data points 312 are laterally to the left of the host vehicle 10, which is shown at lateral position 0 on the x-axis. A similar comparison is performed for the right side offset so that at the conclusion of step 220, the data point in question has been classified as being on the left side, right side, or in the center of the road.

If a particular data point is on the left side of the road, then step 230 directs the method to step 240 where the data point is added to and saved in a left data point set. If a particular data point is on the right side of the road, as previously determined, then step 230 sends the method to step 242 where the data point is added to and saved in a right data point set. If the data point in question corresponds to the center of the road, which is the area in between the left and right side offsets and may include one or more lanes of the road on which the host vehicle 10 is traveling, then step 230 causes that data point to be discarded in step 250. This process may continue until all of the data points have been properly evaluated, at the conclusion of which all of the new data points that remain will have been stored in a left data point set or a right data point set.

Returning to FIG. 2, step 170 takes the pre-sorted data points (i.e., the left and right data point sets) and determines if there is a stationary object present. FIGS. 4A-C are flowcharts that illustrate a more detailed sequence of steps or sub-steps that may be performed while carrying out step 170. The methodology described in FIGS. 4A-C is preferably carried out at least twice per sensor cycle; once for the left data point set and once for the right data point set. For purposes of brevity, FIGS. 4A-C are discussed here only in the context of the left data point set, but it should be appreciated that this description equally applies to the right data point set as well. Starting with step 308, the method compares a data point or group of data points to longitudinal and/or lateral bounds or thresholds. If the data point in question is within the prescribed bounds, then the method considers the data point to be relevant as a potential roadside object and the method continues on to step 310; if the data point is not within the prescribed bounds (it is an outlier in terms of its location), then the method discards the data point at step 314. It is possible for the method to perform some type of dead-reckoning or similar procedure (optional step) for a data point that is within the prescribed bounds and storing such a data point before the method proceeds to step 310.

Next, steps 310 and 312 evaluate a group of data points by validating the data against itself. This step may be accomplished according to any number of different embodiments, including an exemplary one where the method determines a lateral position average and a lateral position variance for the group of data points that was acquired during the current sensor cycle (again, only "new" data points are being processed in this manner, as "old" data points have already been through this process). Skilled artisans will appreciate that the "average" pertains to the mean of the distribution of data point lateral positions, while the "variance" pertains to the spread of the distribution of data point lateral positions (e.g., the average square of the deviations between the data and the average). Other statistical values or quantities, such as the standard deviation, etc., may be used in lieu of or in addition to the statistical values identified above. Any suitable combination of statistical values and/or comparisons may be used in step 310, so long as the step validates the new data points as a group against itself. If the lateral position variance of the group is less than some group threshold, then the method considers this group of data points to be acceptable for further processing and the method proceeds to step 320; if, on the other hand, the lateral position variance of the group is greater than the group threshold, then the method discards the group of data points at step 314.

Steps 320 and 322 evaluate each data point in the group by validating the data with values derived from the previous steps (e.g., the average and variance). Put differently, steps 310 and 312 evaluate the group of data points as a whole, while steps 320 and 322 evaluate each of the data points individually. According to the exemplary embodiment shown here, step 320 determines a lateral position value (Y) for each data point, where Y=((Lateral Position of Data Point-Average)$^2$/Variance). If Y is less than the individual threshold, then the method considers this data point to be acceptable for further processing and retains or stores the data point at step 324; if Y is greater than the individual threshold, then the method considers this data point a statistical outlier in terms of lateral position and discards the data point at step 314. If there are only a few data points under consideration, it is possible for the method to simply pass the group of data points regardless of their lateral position Y values. Other techniques and methods may be used for evaluating and filtering out data points that constitute statistical outliers.

Step 330 then determines if all of the data points in the group have been tested. If there are more data points within the group gathered on the current sensor cycle, then the method simply loops back to step 320 so that steps 320-330 may be repeated. This process continues until all of the data points have been evaluated. At this point, the method may again evaluate the group of retained or stored data points as a whole (e.g., by repeating steps 310 and 312) to ensure that the set of retained data points still satisfies the statistical requirements of the group as a whole.

Once the new data points have been validated as a group and individually, step 340 combines the newly validated data points with previously validated data points from previous sensor cycles. Stated differently, step 340 merges or combines the new data points with old data points before continuing with the method. One potential benefit of this approach is that the method does not have to repeatedly duplicate the data validation process for old data points that have already been validated, as such a process could place a significant processing burden on the control module or other hardware carrying out the present method. The data points shown in the visual representation 500 of FIG. 5 include both new and old data points.

Turning now to the top of FIG. 4B, step 342 sorts the combined data points of the previous step according to their longitudinal position. According to an exemplary embodiment, step 342 sorts or arranges the combined data points, starting with those data points that are furthest ahead of the host vehicle in the longitudinal direction and ending with those data points that are furthest behind the host vehicle in the longitudinal direction. For instance, the data points 512 in FIG. 5 would be at the beginning of the sorted group because they are the data points furthest ahead of the host vehicle 10, while those at the bottom of data points 510 would be at the bottom of the sorted group because they are the furthest data points behind the host vehicle. It is possible for step 342 to limit the data points being evaluated to only those that are within the grid 502, which generally corresponds to an area of interest surrounding the present location of the host vehicle 10. Step 350 then checks to see if there are any sorted data points that are ahead of the host vehicle 10 in terms of longitudinal position (it may be assumed that data points located behind the host vehicle have already been considered for the presence of stationary objects in previous cycles). If there are data points located ahead or forward of the host vehicle (e.g., all of the data points 512 and some of the data points 510 in FIG. 5), then those data points are identified and added to a New Data Point List (I) in step 352; if there are no data points located forward of the host vehicle, then the method assumes that there is no new stationary object present off to the left side of the road.

Steps 360-364 may apply additional longitudinal and/or lateral position checks on the data points in New Data Point List (I) before determining that a stationary object is present. For example, step 360 determines if the overall longitudinal extent of the set of data points in New Data Point List (I) (e.g., the longitudinal distance $D_{LONG}$ between the forward most data point 530 and the host vehicle 10 in grid 502) is greater than some longitudinal threshold. In this instance, the method is evaluating the overall longitudinal or lengthwise extent of the distribution of data points in New Data Point List (I), which only includes those validated data points located ahead of the host vehicle. One potential reason for comparing these data points to a longitudinal threshold relates to detecting the presence of guard rails, barriers and/or other road side objects that longitudinally extend along the shoulder of the road. As mentioned previously, the present method is designed for use with a vehicle operating in some type of automated driving mode; thus, detecting and tracking guard rails, barriers and the like can be particularly helpful, particularly when trying to identify drivable areas and estimate the path or curvature of a road. If the overall longitudinal extent or distance of the data points in New Data Point List (I) does not exceed the longitudinal threshold, then the method assumes that there is no new stationary object present off to the left side of the road; if the overall longitudinal extent of those data points does exceed the longitudinal threshold, then the method continues to step 362.

Step 362 determines if overall lateral extent of the set of data points in New Data Point List (I) (e.g., the lateral distance $D_{LAT}$ between the outer most data point 534 and the inner most data point 530 in grid 502) is less than some lateral threshold. Again, all of the data points in New Data Point List (I) are located forward of the host vehicle 10. This step may help distinguish stationary objects like guard rails and barriers that are relatively constrained or limited in terms of their lateral extent with other objects, such as overhead bridges and large road signs, that may have a rather substantial lateral dimension. Again, it is a possible object of the present method to identify stationary road side objects, like guard rails, that follow the path of the road and are somewhat long and narrow. If the overall lateral extent or distance of the data points in New Data Point List (I) exceeds the lateral threshold, then the method assumes that there is no new stationary object present off to the left side of the road; if the overall lateral extent of those data points does not exceed the lateral threshold (i.e., they are contained laterally), then the method continues to step 364.

Step 364 calculates certain inter-data point spacing (e.g., both longitudinal and lateral spacing between sorted data points in New Data Point List (I)) and compares this spacing to longitudinal and lateral spacing thresholds. Put differently, this step evaluates the tightness or spacing of the data point distribution to be sure that the data points in question are not random unconnected data points, but instead correspond to a larger overall stationary object. It should be appreciated that a number of potential techniques for carrying out this step may be employed. If the inter-data point spacing of the data points in New Data Point List (I) exceeds the longitudinal and/or lateral spacing thresholds, then the method assumes that there is no new stationary object present off to the left side of the road; if the inter-data point spacing does not exceed the spacing thresholds (i.e., they are contained longitudinally and/or laterally), then the method continues to step 370 in FIG. 4C.

In step 370, the data points in New Data Point List (I), which have already been sorted according to their longitudinal position and only include those data points located forward of the host vehicle, are again subjected to statistical evaluation. In one embodiment, step 370 calculates the lateral and/or longitudinal position average and variance for the group of data points in New Data Point List (I), and then compares the lateral and/or longitudinal position of each data point to those values. This is similar to the process performed earlier in steps 320-322 and is, thus, the description of that process is not repeated here. It should be noted that step 370 may be carried out for lateral position, longitudinal position, or both, and that step 370 may be carried out in terms of the group of data points as a whole (similar to steps 310, 312), in terms of individual data points (similar to steps 320, 322), or in terms of both.

Step 376 creates a New Data Point List (II) from all of the data points that passed the statistical evaluation in step 370 and, thus, were retained by the method. According to one example, the data points in the New Data Point List (II) have the following characteristics: they pertain to stationary objects, they pertain to objects only on one side of the road (in the present description, the left side of the road), they pertain to objects located ahead of the host vehicle, they are within certain longitudinal and lateral bounds, and they satisfy one or more statistical requirements. It is possible for step 376 to further reduce or filter the data points in the New Data Point List (II) by taking the intersection of this list and one or more other lists, for example.

At step 380, the method determines if the number of data points in New Data Point List (II) is greater than some point threshold that represents the minimal number of data points needed before the method acknowledges that a new stationary object is present. If the number of data points in New Data Point List (II) exceeds the point threshold, then step 382 sets a flag indicating that a new stationary object is present and the data points in New Data Point List (I) are added to an Overall Data Point List that is an ongoing and updated list of new and old data points that correspond to objects currently located in the grid or area of interest 502. If the number of data points in New Data Point List (II) does not exceed the point threshold, then step 384 sets a flag indicating that a new stationary object is not present and the data points in New Data Point List (I) are not added to the Overall Data Point List. Because this portion of the method is being carried out separately for the left and right sides of the road, it is possible for the method to maintain two separate sets of lists (e.g., a separate New Data Point List (I), New Data Point List (II), and Overall Data Point List for each side of the road). Skilled artisans will appreciate that the present method, and in particular step 380, may employ any number of statistical and/or other mathematical techniques and tools to determine if a stationary object is present. A non-limiting example of such techniques is the chi-square test (e.g., a chi-square test with one degree of freedom).

If it is determined that a new stationary object is not present (step 384), the method may check to see if any old stationary objects from past cycles are still present, step 390. In terms of the example illustrated in FIG. 5, step 390 may check to see if any previously detected stationary objects are thought to still be within the grid 502 that surrounds the host vehicle 10. One way to accomplish this is for step 390 to check to see if a timer based on host vehicle travel speed, which would have been previously set when such objects were detected (e.g., the timer in step 394), has expired. If the timer has expired, such as the case for data points 100 in FIG. 5, for example, then it is assumed that the host vehicle has driven past the old stationary object and that it is no longer present; in this case, the old data points 100 may be removed from the Overall Data Point List so that the list stays current and updated. If the timer has not expired, such as the case for data exemplary data points 102 in FIG. 5, then step 392 sets a flag to indicate that an old stationary object is still present within the grid or area of interest 502.

If it is determined that a new stationary object is present (step 382), then the method proceeds to step 394 so that an obstacle extension, an offset and/or other items can be calculated and a timer can be initiated. As mentioned above, the timer corresponds to the expected amount of time that it takes for the host vehicle to drive past the newly detected stationary object. In the example of FIG. 5, this may mean that a timer is set for the expected amount of time that it takes for a new stationary object, like that corresponding to data points 512, to pass through the grid 512. Other flags, variables, values, timers, etc. may be initialized or set at this or other steps in the method.

At this point step 170, which is designed to determine if a stationary object is present, is completed. For those instances where no stationary object is detected (new or old stationary object) in the grid or area of interest 502, then step 180 directs the method, or at least the current sensor cycle, to end. In those instances where a stationary object is detected (new or old stationary object) in the grid 502, step 180 causes the method to proceed to step 190.

Step 190 applies the pre-sorted data points (in this case, the pre-sorted data points in the Overall Data Point List) to a data fitting algorithm in order to try and obtain a curve or shape of the stationary object that was detected. This may help the present method to better recognize or identify the stationary object being evaluated. Although the present method performs or executes step 190 for stationary objects located on the left and right sides of the road, the following description is only in terms of stationary objects on the left side of the road (similar to step 170), but applies to stationary objects on the right as well. A duplicate description for objects on the right side of the road has been omitted for purposes of brevity. In one embodiment, step 190 uses the data points from the Overall Data Point List (which may include both new and old data points) to calculate a least squares solution for the stationary object(s) located on the left side of the road. Various data or curve fitting techniques and tools may be employed by step 190, including least squares techniques that involve first order (linear), second order (quadratic), or third order (cubic) fits. According to one such technique, curve-fitting step 190 uses pre-sorted data points and historical data in the form of a prior coefficient ($z^{-1}$) as input to a curve-fitting algorithm, and generates predicted data points that correspond to the predicted or projected curve of a stationary object as output. Stationary or fixed objects in the environment or area surrounding the host vehicle 10 can be tracked or monitored in this way. The method is not intended to be limited to any particular type of data fitting technique, as any number of known techniques may be employed in step 190.

According to one possible embodiment of step 190, the data is fit at least twice. During a first iteration, all of the data points (e.g., all of the combined old and new data points from step 340 or all of the data points in the Overall Data Point List) are fit according to a suitable data fitting algorithm; and during a second iteration, the data points are initially tested for outliers, which are discarded, so that the remaining data points can be fit again. Instead of updating the Overall Data Point List during step 170, as described above, it is possible to instead update the Overall Data Point List during step 190 with the data points that were applied to the data fitting algorithm (i.e., the input to the data fitting algorithm) or with the fitted data points that were generated by the data fitting algorithm (i.e., the output of the data fitting algorithm).

Oftentimes, the curve or shape of a stationary object, like a guardrail or other barrier, is indicative of the curve or path of the corresponding road segment, which can be a valuable piece of information when operating a vehicle in an automated driving mode. For example, the present method may provide information or data about the expected path of the road segment to one or more other vehicle systems, which in turn may use that information to generate command signals for automated driving modes. It is possible for the present method to corroborate or verify the fitted shape or curve of the stationary road side object with map data or other information from a vehicle navigation system, for example. The present method is not intended to be limited by the nature or manner in which the output of step 190 is used, as the fitted data may be provided to any number of different systems and methods operating in the host vehicle. For instance, the fitted data that is outputted by step 190 may be used to calculate or estimate the parameters of stationary road side objects and help fill in missing data, if needed, for other algorithms that are controlling the vehicle in an automated mode.

According to the example shown in FIG. 5, the method may conclude that the stationary object located on the left side of the road is a curved guardrail and that the projected path of the road is likely to follow the guardrail. The visual representation 500 may be presented on some type of visual display, like the ones used by a vehicle navigation system or backup camera, and is for the benefit of the driver, as the present method could potentially operate with only the data points and corresponding lists described above. In this example, the method may take the various data points that are part of the Overall Data Point List or some other suitable collection of data points and overlay them on grid 502, which represents an area around the host vehicle 10. These data points represent may represent both current (new) and old (historical) sensor readings. Again, the visual representation 500 is primarily for the benefit of the driver or other vehicle occupants and is not necessary for the proper operation of the present method.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps shown in the flowchart is just one possibility, as the present method may include a combination of steps that has fewer, greater or different steps than that shown here. It is certainly possible for some of the illustrated steps to be combined or otherwise integrated into others. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method for evaluating roadside stationary objects, comprising the steps of:

receiving sensor readings from one or more vehicle mounted sensor(s), the sensor readings include a plurality of data points and each data point corresponds to an object that is within a field-of-view of one of the sensors;

consolidating the plurality of data points into a smaller set of consolidated data points;

classifying the consolidated data points into a first set of classified data points that correspond to one or more stationary objects and a second set of classified data points that correspond to moving objects, providing the second set of classified data points to a separate target tracking algorithm, and then discarding the second set of classified data points;

pre-sorting the first set of classified data points into first and second smaller sets of pre-sorted data points, the first set of pre-sorted data points correspond to one or more stationary objects located only on a left side of the road and the second set of pre-sorted data points correspond to one or more stationary objects located only on a right side of the road;

determining if there is one or more stationary objects present on the left side of the road by using the first set of pre-sorted data points, and determining if there is one or more stationary objects present on the right side of the road by using the second set of pre-sorted data points; and when there is a stationary object present on the left side of the road then applying the first set of pre-sorted data points to a data fitting algorithm that estimates a size, shape and/or location of the stationary object, and when there is a stationary object present on the right side of the road then applying the second set of pre-sorted data points to a data fitting algorithm that estimates a size, shape and/or location of the stationary object.

2. The method of claim 1, wherein each data point corresponds to an object that is within a field-of-view of one of the sensors and is provided in the form of coordinates that indicate the relative position of the object to the sensor.

3. The method of claim 1, wherein the consolidating step further comprises consolidating the plurality of data points into a smaller set of consolidated data points by reducing the number of data points through the application of one or more of the following technique(s): a clustering technique, a grouping technique, or a mapping technique.

4. The method of claim 1, wherein the classifying step further comprises classifying the consolidated data points into the first and second set of classified data points by using Doppler measurements in conjunction with dynamic information gathered from sensors on the host vehicle to determine if each data point corresponds to a stationary object.

5. The method of claim 1, wherein the pre-sorting step further comprises identifying a classified data point that corresponds to a left side of the road and adding that data point to the first set of pre-sorted data points, and identifying a classified data point that corresponds to a right side of the road and adding that data point to the second set of pre-sorted data points.

6. The method of claim 5, wherein the pre-sorting step further comprises comparing a lateral position of a classified data point to a left side offset and when the lateral position is left of the left side offset then adding that data point to the first set of pre-sorted data points, and comparing a lateral position of a classified data point to a right side offset and when the lateral position is right of the right side offset then adding that data point to the second set of pre-sorted data points.

7. The method of claim 1, wherein the determining step is carried out separately to determine if there is one or more stationary objects present on the left side of the road and to determine if there is one or more stationary objects present on the right side of the road.

8. The method of claim 1, wherein the pre-sorting step or the determining step further comprises determining if a data point was sensed during a current sensor cycle (new data point) or a past sensor cycle (old data point), and discarding the data point as an old data point if it was sensed during a past sensor cycle.

9. The method of claim 1, wherein the pre-sorting step or the determining step further comprises comparing a lateral position of a data point to a lateral threshold and comparing a longitudinal position of the same data point to a longitudinal threshold, and discarding the data point as an outlier if either the lateral position is not within the lateral threshold or the longitudinal position is not within the longitudinal threshold.

10. The method of claim 1, wherein the pre-sorting step or the determining step further comprises statistically validating a group of data points as a whole.

11. The method of claim 10, wherein the pre-sorting step or the determining step further comprises statistically validating the group of data points as a whole by comparing a lateral position variance for the group to a group threshold, and discarding data points if the lateral position variance for the group is greater than the group threshold.

12. The method of claim 1, wherein the pre-sorting step or the determining step further comprises statistically validating each data point in a group of data points individually.

13. The method of claim 12, wherein the pre-sorting step or the determining step further comprises statistically validating each data point individually by comparing a lateral position value Y for each data point to an individual threshold, and discarding the data point if the lateral position value Y is greater than the individual threshold, the lateral position value Y=((Lateral Position of Data Point-Average)$^2$/Variance).

14. The method of claim 1, wherein the pre-sorting step or the determining step further comprises combining a group of statistically validated data points gathered during a current sensor cycle (new data points) with a group of statistically validated data points previously gathered during one or more previous sensor cycles (old data points) into a group of combined data points, wherein the combined data points corresponds to objects on either the left side of the road or the right side of the road.

15. The method of claim 14, wherein the pre-sorting step or the determining step further comprises sorting the group of combined data points according to their longitudinal position.

16. The method of claim 1, wherein the pre-sorting step or the determining step further comprises identifying data points that are located longitudinally ahead of the host vehicle, and adding such data points to a data point list (New Data Point List (I)).

17. The method of claim 16, wherein if there are no data points that are located ahead of the host vehicle, then the determining step further comprises determining that there are no stationary objects present on either left side of the road or the right side of the road.

18. The method of claim 1, wherein the pre-sorting step or the determining step further comprises determining if an overall longitudinal extent or distance ($D_{LONG}$) of data points is greater than a longitudinal threshold, and discarding data points if the overall longitudinal extent or distance ($D_{LONG}$) is not greater than the longitudinal threshold.

19. The method of claim 1, wherein the pre-sorting step or the determining step further comprises determining if an overall lateral extent or distance ($D_{LAT}$) of data points is less than a lateral threshold, and discarding data points if the overall lateral extent or distance ($D_{LAT}$) is not less than the lateral threshold.

20. The method of claim 1, wherein the pre-sorting step or the determining step further comprises calculating longitudinal and lateral inter-data point spacing of data points and comparing the inter-data point spacing to longitudinal and lateral spacing thresholds, and discarding data points if the longitudinal inter-data point spacing is greater than the longitudinal spacing threshold or if the lateral inter-data point spacing is greater than the lateral spacing threshold.

21. The method of claim 1, wherein the determining step further comprises comparing the number of data points in a data point list (New Data Point List (II)) to a point threshold, and determining that there is a stationary object present on either the left side of the road or the right side of the road when the number of data points in the data point list is greater than the point threshold.

22. The method of claim 1, wherein the determining step further comprises employing a chi-square test to determine if a stationary object is present.

23. The method of claim 1, wherein the determining step further comprises evaluating a timer that corresponds to a previously detected old stationary object from a past sensor cycle to determine if the old stationary object is still present or if the host vehicle has driven past the old stationary object.

24. The method of claim 1, wherein the applying step further comprises applying at least one of the first or second sets of pre-sorted data points to a data fitting algorithm that estimates a size, shape and/or location of a stationary guardrail located on either the left or the right side of the road.

25. The method of claim 1, further comprising the step of:
providing the output of the data fitting algorithm to a separate algorithm that controls one or more aspects of operating the vehicle in an automated driving mode.

26. The method of claim 1, further comprising the step of:
providing a visual representation to the driver that includes a grid or area of interest surrounding the host vehicle, wherein the output of the data fitting algorithm is represented in the grid and is updated as the host vehicle drives along the road.

* * * * *